United States Patent
Roura et al.

(10) Patent No.: US 10,495,057 B2
(45) Date of Patent: Dec. 3, 2019

(54) BOLTED ATTACHMENT FOR ATTACHING WIND TURBINE PARTS

(71) Applicant: Alstom Renewable Technologies Wind B.V., GS Ridderkerk (NL)

(72) Inventors: Ferran Roura, Olot (ES); Jose Luis Roman Mallada, Sant Just Desvern (ES); Nicolas Velazquez, Barcelona (ES)

(73) Assignee: GE RENEWABLE TECHNOLOGIES WIND B.V., Breda (NL)

( * ) Notice: Subject to any disclaimer, the term of this patent is extended or adjusted under 35 U.S.C. 154(b) by 203 days.

(21) Appl. No.: 15/536,180

(22) PCT Filed: Dec. 15, 2015

(86) PCT No.: PCT/EP2015/079787
§ 371 (c)(1),
(2) Date: Jun. 15, 2017

(87) PCT Pub. No.: WO2016/096854
PCT Pub. Date: Jun. 23, 2016

(65) Prior Publication Data
US 2017/0342958 A1 Nov. 30, 2017

(30) Foreign Application Priority Data
Dec. 15, 2014 (EP) .................................... 14382517

(51) Int. Cl.
*F03D 1/06* (2006.01)
*F16B 35/04* (2006.01)
(Continued)

(52) U.S. Cl.
CPC ......... *F03D 1/0658* (2013.01); *F03D 1/0675* (2013.01); *F03D 7/0204* (2013.01);
(Continued)

(58) Field of Classification Search
CPC .... F16B 5/0275; F16B 35/041; F03D 1/0658; F05B 2260/301
See application file for complete search history.

(56) References Cited

U.S. PATENT DOCUMENTS 2,060,593 A 11/1936 Schaurte et al.
2,341,469 A 2/1944 Newall
(Continued)

OTHER PUBLICATIONS

"MaBtabelle—DIN 2510 Form Z," Retrieved from the Internet URL: http://gueldner.agenturkundenserver.de/upload/images/DIN2510/Datenblatter/Datenblatt DIN 2510 FormL.pdf, on Jul. 12, 2017, pp. 1 (Oct. 23, 2014).
(Continued)

*Primary Examiner* — Richard A Edgar
(74) *Attorney, Agent, or Firm* — Dority & Manning, P.A.

(57) ABSTRACT

A bolted attachment having opposite threaded sections between which a shank is provided having at least two shank sections with different diameter located at a length from the threaded section of at least three times the difference between a diameter of a threaded section and a minimum diameter of the shank. At least one conical transition is formed between two adjacent shank sections where the ratio of its length to a difference between a diameter at one end of the transition and a diameter at the opposite end of the transition is of at least 0.85.

9 Claims, 1 Drawing Sheet

(51) Int. Cl.
  *F16B 31/06* (2006.01)
  *F03D 80/70* (2016.01)
  *F03D 7/02* (2006.01)
(52) U.S. Cl.
  CPC .......... *F03D 7/0224* (2013.01); *F03D 80/70* (2016.05); *F16B 31/06* (2013.01); *F16B 35/041* (2013.01); *F05B 2260/301* (2013.01); *Y02E 10/721* (2013.01)

(56) References Cited

U.S. PATENT DOCUMENTS

| | | | | |
|---|---|---|---|---|
| 4,469,956 A * | 9/1984 | D'Amato | ................ | F03D 9/255 290/55 |
| 5,779,416 A | 7/1998 | Sternitzky | | |
| 6,381,827 B1 * | 5/2002 | Steinbock | ............. | B23P 19/068 29/452 |
| 8,025,485 B2 | 9/2011 | Jacobsen | | |
| 8,047,792 B2 * | 11/2011 | Bech | ..................... | F03D 1/0658 416/147 |
| 9,109,578 B2 * | 8/2015 | Jacobsen | ................... | F03D 1/06 |
| 9,512,868 B2 * | 12/2016 | Stempniewski | ...... | F16B 13/065 |
| 2014/0216390 A1 * | 8/2014 | Wiebe | ................... | F16B 5/0275 123/195 R |

OTHER PUBLICATIONS

Extended European Search Report and Opinion issued in connection with corresponding EP Application No. 14382517.2 dated Jun. 15, 2015.

International Search Report and Written Opinion issued in connection with corresponding PCT Application No. PCT/EP2015/079787 dated Jan. 18, 2016.

International Preliminary Report on Patentability issued in connection with corresponding PCT Application No. PCT/EP2015/079787 dated Jun. 20, 2017.

* cited by examiner

BOLTED ATTACHMENT FOR ATTACHING WIND TURBINE PARTS

CROSS REFERENCES TO RELATED APPLICATIONS

This application claims the benefit of European Patent Application EP14382517.2 entitled "BOLTED ATTACHMENT FOR ATTACHING WIND TURBINE PARTS" filed Dec. 15, 2014 and International Application PCT/EP2015/079787 entitled "BOLTED ATTACHMENT FOR ATTACHING WIND TURBINE PARTS" filed Dec. 15, 2015.

FIELD OF INVENTION

The present disclosure relates to bolted attachments for attaching wind turbine parts.

BACKGROUND

The present disclosure relates to bolted attachments for attaching wind turbine parts.

It is known in the field of wind turbine applications that bolted attachments for attaching parts, such as for example the blades to the hub, usually do not last the whole wind turbine generator life. As a preventive maintenance, a specific number of bolts is usually required to be replaced over the service life of the wind turbine parts. Frequent replacement of bolts results in increased costs resulting in that the wind turbine is less attractive for the customer.

In the particular case of wind turbine blade bolted attachment, efforts to minimize the above mentioned drawback have been made in an attempt to reach the required life for the bolted attachment. For example, it has been proposed to provide an extender between the pitch bearing and the blade in order to extend the service life of the attachment. However, this has a number of disadvantages. For example, the extender adds extra costs to the wind turbine and problems arise with the transport of the rotor assembly by truck as maximum height is usually exceeded if the extender is assembled in the assembly plant. On the other hand, if the extender is assembled to the blade in the blade supplier plant, blade costs are increased and logistics becomes difficult in order to prevent delays in planning. Furthermore, if the extender is installed on the site, the time spent in the installation process becomes longer, and the process becomes more expensive and more complicated.

The use of circumferentially spaced blade bolts for attaching wind turbine blades to a wind turbine rotor hub. The blade bolts have opposite cylindrical threaded end sections for physical engagement with said parts of the wind turbine, and a non-cylindrical shank extending between aid end sections. One or more flattened sides are defined in the shank along a longitudinal axis of the bolt.

The bolts may have advantageous load and fatigue characteristics to improve fatigue behaviour without reducing the extreme load strength of the bolts. However, bolts are not axisymmetric since their shanks are non-cylindrical due to the flattened sides defined along the longitudinal axis of the bolt. This results in the disadvantages that the assembly of the bolts has to be carried under rigorous control, and that manufacturing of bolts is difficult and highly increases bolt costs.

Therefore, the need for bolted attachments for attaching wind turbine parts still remains such that improved fatigue characteristics are provided without reducing the extreme load strength of the bolts and while avoiding added costs and complexity to the assembly.

SUMMARY

A bolted attachment for attaching wind turbine parts is disclosed with which the above prior art disadvantages are at least reduced while providing further advantages, especially in simplicity and effectiveness.

The present bolted attachment is intended to attach at least a first wind turbine part to at least a second wind turbine part which parts are subjected to variable loads acting in different planes as is the case when the wind turbine parts are in use.

Examples of wind turbine parts to be attached with the present bolted attachment are at least one of a wind turbine rotor hub, a wind turbine blade extender, a wind turbine yaw mechanism and a wind turbine blade pitch mechanism. In some embodiments, the first part may be, or may be part of, a wind turbine pitch bearing and the second part is, or is part of, a wind turbine blade. In further examples, the first part may be, or may be part of, a wind turbine hub and the second part is, or is part of, a wind turbine pitch bearing. In other examples, the first part may be, or may be part of, a wind turbine pitch bearing and the second part is, or is part of, a wind turbine blade extender. Still in further examples of applications of the present bolted attachment, the first part may be, or may be part of, a wind turbine nacelle and the second part is, or is part of, a wind turbine yaw bearing. The case where the first part is, or is part of, a wind turbine yaw bearing and the second part is, or is part of, a wind turbine tower is not ruled out.

The present bolted attachment comprises at least one bolt. Each bolt has a shank and at least one threaded section. In one embodiment, each bolt has two opposite cylindrical threaded sections between which a shank is formed. The bolt may be symmetrical about an axis perpendicular to a longitudinal axis thereof.

The shank in the bolts of the present bolted attachment comprises at least two shank sections. Said at least two shank sections are different and specifically they are of different diameter. Specifically, said at least two shank sections having different diameter of the bolt shank are located at a given length from the threaded section.

Positioning of said two or more different diameter shank sections in the bolt shank is such that at least one of said shank sections is located at a length from the threaded section of three or more times the difference between a diameter D1 of a threaded section and a minimum diameter D2 of the shank. This ratio of the distance between the threaded section of the bolt and the different diameter shank sections to the difference between a diameter of a threaded section and a minimum diameter of the shank allows good fatigue behaviour to be obtained and extreme load strength of the bolt to be efficiently controlled. Finite element method calculations have proved that, with the present bolted attachment, fatigue strength can be improved by around 30%.

Provision of bolts having different diameter shank sections at a length from the threaded section as disclosed above has been shown to increase the service life of the attachment due to an optimal distribution of the rigidity in the particular wind turbine part bolted attachment. An improvement in fatigue resistance has been thus obtained. With the above improved bolt design extra components, such as blade extenders, might be not required, thus reducing wind turbine generator global costs.

In an embodiment, at least one transition is formed between two adjacent shank sections. Said transition between two adjacent shank sections may be conical in shape whether such conical shape has a straight or curved generatrix. Where a transition is formed between two adjacent shank sections, in an embodiment, the ratio of the length of the transition to a difference between a diameter at one end of the transition and a diameter at the opposite end of the transition is of at least 0.85 and more particularly is 1.3. Such transitions between two adjacent shank sections avoid stress concentrations, thus optimizing structural behaviour of the bolt attachment.

In an embodiment, the minimum diameter in a shank section is in the range of 65-70 percent of the diameter of threaded section. Additionally, in an embodiment the total length of the minimum diameter shank sections is in the range of 70-75 percent of the total length of the shank.

The above ratios of the present bolted connection are optimal for a case where the equivalent fatigue load in the bolted connection is of about 75% of the ultimate load.

The diameter of a shank section is greater in critical zones that in the rest of the shank. The global behaviour of the bolt is not affected by said different diameter shank sections and loads being transmitted through the bolt are not increased, since the ratio of stiffness of the bolt to the attached wind turbine parts is almost not changed. On the other hand, the cross section and the moment of inertia of the bolt critical sections are increased. As a result, when current single shank reduction limit is reached, the present bolted attachment allows the stresses in the critical sections to be reduced while still improving the fatigue behaviour of the bolted attachment. In this respect, in an embodiment the diameter of a shank section that is located closest to a threaded section is larger than the diameter of a shank section that is located furthest from a threaded section.

The bolts of the present bolted attachment having different diameter shank sections along its length instead of single, constant diameter shank sections, have been shown to be advantageous since ultimate strength and bending flexibility of the bolt is maximized, which improves fatigue behaviour and avoids failure in the bolt threads. In addition to the above advantage, the costs of the bolts in the present bolted attachment are similar to that of prior art standard bolts. Finally, it is important to note that with the bolts of the present bolted attachment having different diameter shank sections preventive maintenance operations can be at least reduced, and even avoided, as such bolts could last the whole wind turbine generator life.

Additional objects, advantages and features of embodiments of the present bolted attachment for wind turbine parts will become apparent to those skilled in the art upon examination of the description, or may be learned by practice thereof.

BRIEF DESCRIPTION OF THE DRAWINGS

Particular embodiments of the present bolted attachment will be described in the following by way of non-limiting examples, with reference to the appended drawings in which.

DETAILED DESCRIPTION

Figure 1:
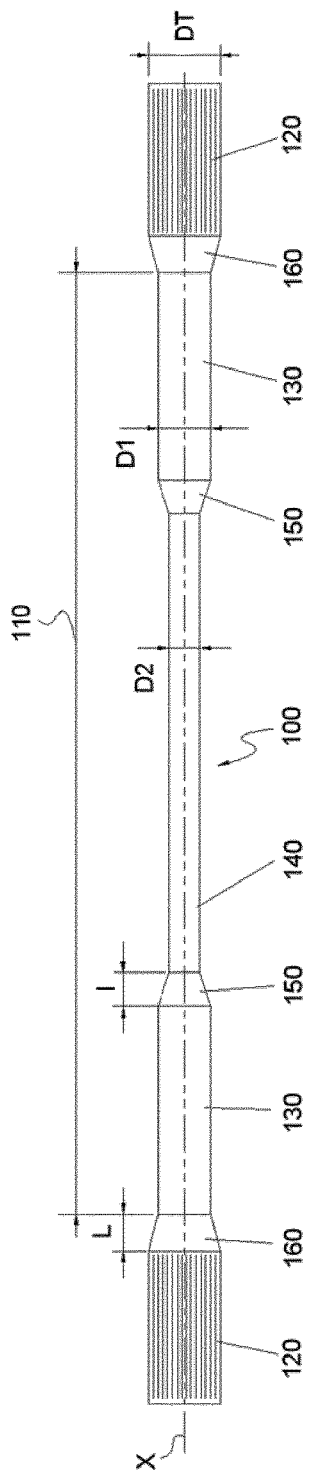
FIG. 1 diagrammatically shows one example of a bolt that is part of the present bolted attachment.

The bolted attachment in the example illustrated in the figures comprises a number of bolts, one of which is shown in FIG. 1 and designated by reference numeral 100 as a whole. Bolt 100 has a shank 110 extending between two opposite cylindrical threaded sections 120. In the specific example shown in FIG. 1, bolt 100 is symmetrical about an axis perpendicular to its longitudinal axis X. Other constructions where bolt 100 is not symmetrical are also conceivable according to the present disclosure.

The shank 110 of the bolt 100 comprises a first shank section 130 having a first diameter D1 and a second shank section 140 having a second diameter D2. The diameter D1 of the first shank section 130 is larger than the diameter D2 of the second shank section 140. In general, a diameter D1 of a shank section that is located closest to a threaded section 120 is larger than a diameter D2 of a shank section that is located furthest from a threaded section 120. As stated above, bolt 100 is symmetrical about an axis perpendicular to its longitudinal axis X, so that the shank 110 of the bolt 100 has two first shank sections 130, as shown in FIG. 1, between which one second shank section 140 extends.

In the example shown, the first shank section 130 is located at a length L from threaded section 120. Here, the value for such length is $L=3\times(DT-D2)$, wherein DT is a diameter of the threaded section and D2 is the above mentioned second diameter of the second shank section 140, which is the minimum diameter of the shank 110. Such value L for the positioning of at least one of the different diameter sections 130, 140 provides good fatigue behaviour while extreme load strength of the bolt 100 can be efficiently controlled.

In the example shown, the diameter D2 of the second shank section 140, which is the minimum diameter of the shank 110, is in the range of 65-70 percent of the diameter DT of threaded section, that is, $D2=0.65-0.70\times DT$. Here, the total length of the shank section 140 with diameter D2, which is the minimum diameter of the shank 110, is in the range of 70-75 percent of a total length of the shank 110.

This allows an optimal distribution of the rigidity to be provided in the particular wind turbine parts 170, 180 being attached, as it will described further below.

In the example shown, respective conical transitions 150 are formed between the shank sections 130, 140 of the bolt 100. Here, the ratio of the length l of the conical transitions 150 to a difference between a diameter at one end of the transition 150 and a diameter at the opposite end of the transition 150 such as, for example, the difference between said first and second diameters D1, D2 of the first and second shank sections 130, 140, is 1.3 in the example shown. A conical connecting portion 160 is also provided between the threaded section 120 and the corresponding first shank section 130 adjacent thereto.

Conical transitions 150 in the shank 110 avoid stress concentrations. This results in that the structural behaviour of the bolt attachment is optimized. This is very important in the field of wind turbines where the parts to be attached are subjected to variable loads acting in different planes both when in use and even when the wind turbine is not in operation.

Figure 2:
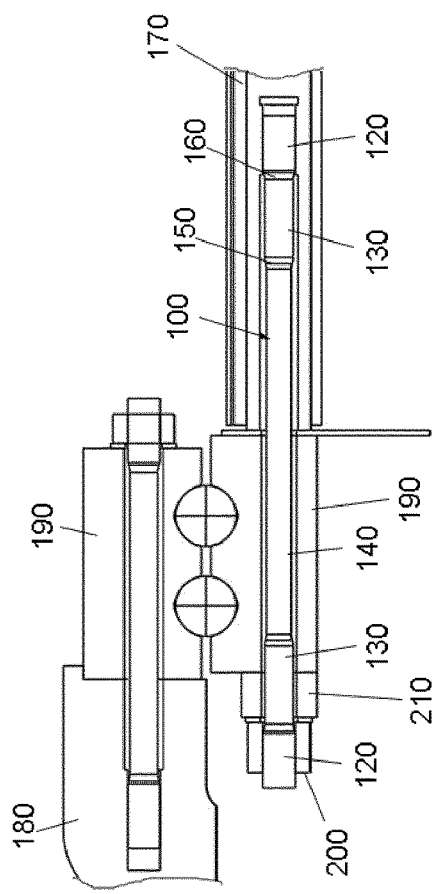
FIG. 2 diagrammatically shows a bolted attachment including the bolt illustrated in FIG. 1 for attaching a wind turbine blade to a wind turbine hub.

Referring now to FIG. 2 of the drawings, an example is shown in which the bolted attachment comprising the bolt 100 described above is used for attaching a wind turbine blade 170 to a wind turbine hub 180 through a bearing arrangement 190. In this case, and as shown in the right hand side of FIG. 2, a first threaded section 120 of the bolt 100 is screwed on one end of the wind turbine blade 170 while a second threaded section 120 of the bolt 100 is screwed on a female thread element 200. Between said female thread element 200 and the bearing arrangement 190, a spacer 210 is provided. The spacer 210 may or may not be present in the bolted attachment. If a spacer 210 is provided as in the embodiment shown in FIG. 2, the spacer 210 may be provided in at least one of the bolts 100 in the bolted attachment. The spacer 210 may comprise, for example, one or a plurality of bushings which may be e.g. cylindrical bushings. In the particular embodiment shown in FIG. 2, the spacer is a single ring or flange 210 that is applied to the entire bolted attachment. The ring 210 is provided with a number of through bores formed therein for receiving corresponding bolts 100. The ring 210 serves the purpose of adding length to the bolted attachment. In the particular embodiment shown in FIG. 2, the ring 210 also provides stiffness to the attachment.

Although only a number of particular embodiments and examples of the present bolted attachment have been disclosed herein, it will be understood by those skilled in the art that other alternative embodiments and/or uses, obvious modifications and equivalents thereof are possible. Furthermore, the present disclosure covers all possible combinations of the particular embodiments described herein so it should not be limited by particular embodiments but only by a fair reading of the claims that follow.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bolted attachment for attaching at least a rotor blade to a hub in a wind turbine, wherein the rotor blade and the hub are subjected to variable loads acting in different planes, the bolted attachment comprising:
   at least one bolt comprising a shank; and
   two threaded sections at opposite ends of the shank, each of the two threaded sections having equal diameters;
   wherein the shank comprises at least two shank sections having different diameters, with at least one of said shank sections being located at a length from the two threaded section of at least three times the difference between the equal diameters of the two threaded sections and a minimum diameter of the shank.

2. The bolted attachment according to claim 1, wherein the at least two shank sections are adjacent shank sections and wherein at least one transition is formed between the adjacent shank sections.

3. The bolted attachment according to claim 2, wherein the transition is conical in shape.

4. The bolted attachment according to claim 3, wherein a ratio of a length of the transition to a difference between a diameter at one end of the transition and a diameter at the opposite end of the transition is at least 0.85.

5. The bolted attachment according to claim 4, wherein the ratio of the length of the transition to the difference between the diameter at one end of the transition and the diameter at the opposite end of the transition is 1.3.

6. The bolted attachment according to claim 3, wherein the conical shape of the transition has a curved generatrix.

7. The bolted attachment according to claim 1, wherein the diameter of a shank section closest to the at least one threaded section is larger than the diameter of a shank section furthest from the at least one threaded section.

8. The bolted attachment according to claim 1, wherein the minimum diameter of the shank is in the range of 65-70 percent of the diameter of the threaded section.

9. The bolted attachment according to claim 1, wherein a total length of the minimum diameter of the shank is in the range of 70-75 percent of the total length of the shank.

* * * * *